United States Patent
Kaja et al.

[11] Patent Number: 6,131,796
[45] Date of Patent: *Oct. 17, 2000

[54] DIRECT BRAZING OF REFRACTORY METAL FEATURES

[75] Inventors: Suryanarayana Kaja, Hopewell Junction; Srinivasa N. Reddy, Lagrangeville; Donald Rene Wall, Poughkeepsie, all of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/960,563

[22] Filed: Oct. 30, 1997

[51] Int. Cl.[7] .............................. B23K 1/19; B23K 20/22; B23K 31/02; B23K 35/24
[52] U.S. Cl. .................................... 228/122.1; 228/233.2; 228/262.8
[58] Field of Search .............................. 228/262.7, 262.8, 228/233.2, 235.1, 122.1

[56] References Cited

U.S. PATENT DOCUMENTS

| | | |
|---|---|---|
| 1,883,650 | 10/1932 | Engle et al. . |
| 2,037,446 | 4/1936 | Weiger et al. . |
| 2,163,409 | 6/1939 | Pulfrich . |
| 3,163,500 | 12/1964 | Konrad et al. . |
| 4,017,266 | 4/1977 | Goldberg et al. ........................ 428/600 |
| 4,287,380 | 9/1981 | Fairbanks et al. ............................ 13/6 |
| 4,418,857 | 12/1983 | Ainslie et al. . |
| 4,451,540 | 5/1984 | Baird et al. . |
| 4,634,638 | 1/1987 | Ainslie et al. . |
| 4,703,884 | 11/1987 | Landingham et al. ................... 228/122 |
| 4,714,982 | 12/1987 | Prasad et al. ............................ 361/404 |
| 4,835,593 | 5/1989 | Arnold et al. . |
| 4,938,409 | 7/1990 | Roberts ..................................... 228/178 |
| 5,168,344 | 12/1992 | Ehlert et al. ............................. 257/693 |

FOREIGN PATENT DOCUMENTS 62-016896  1/1987  Japan .

*Primary Examiner*—Patrick Ryan
*Assistant Examiner*—Kiley Stoner
*Attorney, Agent, or Firm*—Tiffany L. Townsend

[57] ABSTRACT

A brazing method for the direct bonding of a metallic item to a refractory metal without the need for an adhesion layer. The direct brazing process uses a Cu—Ag—Ni alloy which eliminates the need for the steps of plating a refractory metal to be bonded to a metallic material with a nickel layer (or other nickel-containing adhesion layer) and diffusion annealing the plated refractory metal prior to brazing. The brazed joint produced by the direct brazing method between a refractory metal and a metallic item has a substantially reduced layer of nickel in the as-brazed joint which improves the mechanical properties of the joint.

11 Claims, 4 Drawing Sheets

DIRECT BRAZING OF REFRACTORY METAL FEATURES

FIELD OF THE INVENTION

The invention relates to a method of direct brazing refractory metals to other metallic items. More specifically, the invention relates to a method of direct brazing refractory metal features such as tungsten or molybdenum containing input/output pads of microelectronic packages to other metal features such as metallic connection pins.

BACKGROUND OF THE INVENTION

Ceramic substrates are used in microelectronic packaging of semi-conductor chips. In semi-conductor chip packaging, it is known to provide input/output (I/O) pads on the surface of a ceramic substrate to which the leads of a semi-conductor chip are connected. I/O connector pins are typically brazed on the I/O pads of these ceramic substrates for establishing electrical connections to the next level of packaging. A variety of braze materials, such as pure silver and Cu—Ag brazes, have commonly been used to connect I/O connector pins to I/O pads which typically comprise refractory metals such as molybdenum, tungsten, or their alloys. It is known, however, that I/O connector pins are not easily brazed directly on surface pads of these refractory metal surface pads without first plating a thin layer of nickel (or other suitable nickel-containing material) as an adhesion layer on the refractory metal surface pad.

Plating of the surface pads requires the use of plating processes such as electroless plating techniques with materials such as Ni—B or Ni—P, or electrochemical plating techniques using electrodes to plate each feature with pure Ni. After plating the refractory metal surface pads, a diffusion anneal is performed to enhance adhesion between the surface pad and the plated material. Typically, diffusion annealing is conducted at 700° C.–900° C. to facilitate the formation of a good bond between the nickel-plated material and the refractory metal surface pad.

After performing these nickel-plating and diffusion annealing steps, the resultant nickel-plated surface of the refractory metal surface pad can then be brazed to I/O connection pins. Typically these I/O connection pins are made of a KOVAR® iron (52–57 wt %)-nickel (28–30 wt %)-cobalt (15–18 wt %) alloy or a KOVAR® alloy which has been nickel-plated. A eutectic copper-silver braze material having a composition of 28 wt %Cu-72 wt %Ag is commonly used to braze the I/O connector pin to the nickel-plated refractory metal surface pad.

The steps of nickel-plating and diffusion annealing required to bond the I/O connection pins to the I/O surface pads are expensive and time consuming. The braze alloy and brazing process of the present invention provides for the direct brazing of refractory metal surfaces thus eliminating the need for nickel-plating and diffusion-annealing steps required by brazing operations involving refractory metal features using conventional braze alloys.

SUMMARY OF THE INVENTION

According to the present invention a brazing method is provided which overcomes the above-discussed and numerous other disadvantages and deficiencies of prior art brazes by providing for the direct bonding of a metallic item to a refractory metal without the need for an adhesion layer. The direct brazing process uses a Cu—Ag—Ni alloy which eliminates the need for the steps of plating a refractory metal to be bonded to a metallic material with a nickel layer (or other nickel-containing adhesion layer) and diffusion annealing the plated refractory metal prior to brazing.

As a result of the Cu—Ag—Ni braze alloy according to the present invention, a brazed joint between a refractory metal and a metallic item is also provided having a substantially reduced layer of nickel in the as-brazed joint.

BRIEF DESCRIPTION OF THE FIGURES

The invention is best understood from the following detailed description when read in connection with the accompanying figures, in which.

DETAILED DESCRIPTION OF THE INVENTION

Figure 1A:
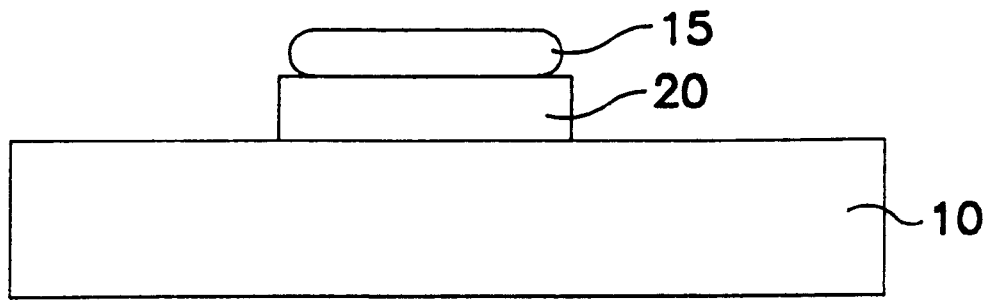
FIGS. 1A–1C are partial cross-sectional views illustrating the steps of direct brazing a refractory metal surface pad located on a ceramic carrier to a metallic I/O pin using a pre-form brazing slug according to a process of the present invention.

The present invention provides a process for direct brazing of refractory metals to other metallic objects without the need for depositing and diffusion annealing an adhesion layer on the refractory metals. Specifically, the refractory metals to be joined are molybdenum, tungsten, or combinations of these metals which preferably are incorporated into various microelectronic packaging features such as bonding pads located on the surface of a ceramic substrate for semiconductor packaging. It is emphasized that, pursuant to common practice, the various dimensions of the component packaging components according to the present invention as shown in the figures are not necessarily to scale. To the contrary, the various dimensions shown may be arbitrarily expanded or reduced for clarity.

In order to evaluate the effectiveness of a ternary Cu—Ag—Ni alloy in brazing refractory metals, nickel was added in various amounts in up to 10 wt % to an eutectic copper-silver braze material having a composition of 28 wt %Cu-72 wt %Ag. Both a two-step process and a continuous brazing process were also evaluated using the ternary Cu—Ag—Ni alloy for brazing refractory metals to other metallic objects. The various ternary braze compositions were tested using two braze forms, namely, in a pre-form braze slug and in a braze paste. The direct brazing process of the present invention was evaluated by brazing test structures constructed by placing I/O connection pins on ternary Cu—Ag—Ni alloy pre-form braze slugs or braze pastes on refractory metal surface pads located on a ceramic substrate.

In order to evaluate the properties of the resultant joints for the direct brazing method of the present invention, physical testing and visual observation of the test structures was performed. The physical testing conducted was a "Pin-Pull" test performed by placing the specimens into an INSTRON® Tensile Testing machine and applying an increasing load until failure occurred. The various types of failure which occurred indicated the strength of the braze joint. Failures which occurred in the shank portion of the pin (i.e., "shank-fails"), rather than in the braze material in the interface between the I/O connection pin and the refractory metal surface pad, indicated that the joint was acceptable. Failures in which the refractory metal surface pad was pulled off the ceramic indicated, however, that the joint was unacceptable.

Visual observation of the physical status of the braze was conducted to determine whether the braze wetted the refractory metal surface pad and to determine the relative condition of the resultant fillet and the relative wetting angle of the braze. In order to further evaluate the effectiveness of the braze in wetting the refractory metal surface pad, the relative amount by which the braze moved up the pin shank (known as "braze climb") was also evaluated. In cases where the braze material was drawn primarily on the pin shank, this indicated that the refractory metal surface pad was not wetted because the braze exhibited a greater affinity for the pin than for the pad. Thus, the lower the amount of braze climb, the better the braze alloy composition with respect to wetting and bonding a refractory metal surface pad.

Figure 1B:
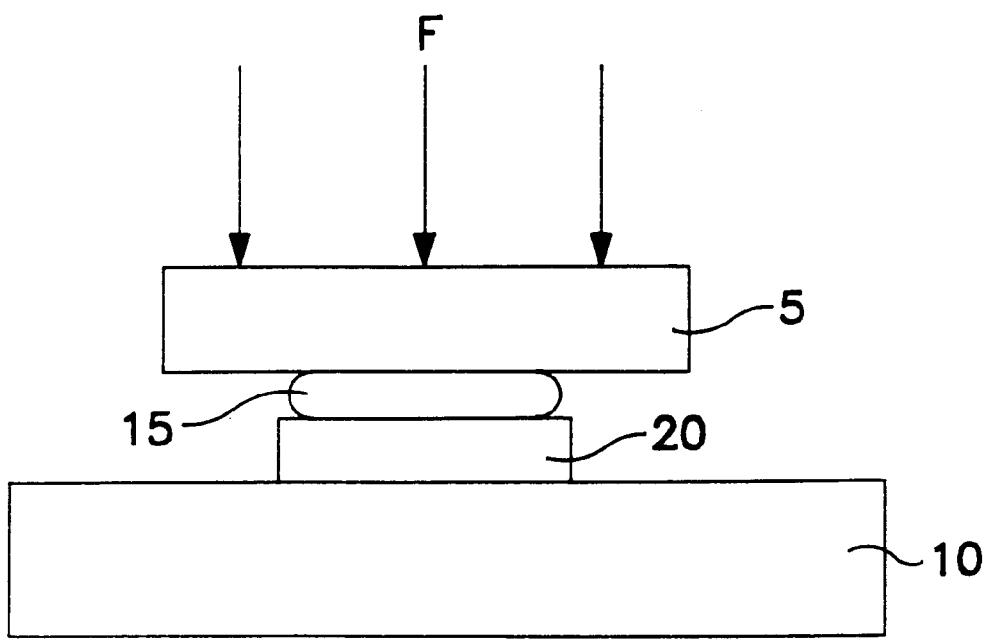

The specific materials combinations, heating steps, heating conditions, and resultant data are set forth in detail below in Tables 1–3 using the following abbreviations:

Refractory Metal Surface Pad
  Moly=77 wt % molybdenum-23 wt % alumina and glass
  W=95 wt % Tungsten-5 wt % Alumina
Ceramic Substrate
  $Al_2O_3$=89 wt % alumina-11 wt % glass frit
  AlN=100 wt % aluminum nitride
Pin Type
  A=Ni-Plated KOVAR® alloy (52–57 wt %Fe/28–30 wt %Ni/15–18 wt %Co)
  0.015 inch diameter shank
  0.036 diameter base
  (Expected shank failure at 18 pounds tensile force)
  B=KOVAR® alloy (52–57 wt %Fe/28–30 wt %Ni/15–18 wt %Co) Pin
  0.024 inch diameter shank
  0.031 diameter base
  (Expected shank failure at 37 pounds tensile force)
Braze Climb/Fillet Quality
  min=minimum
  mod=moderate
  max=maximum
  N/A=Not Available
  - -=Not Applicable
Two Step Braze Process Referring now to the figures, wherein like reference numerals refer to like elements throughout, shown in FIGS. 1A–1D is the sequence of steps for performing a two-step direct brazing process according to the present invention. A pre-form braze slug 15 of a ternary copper-silver-nickel braze material is first provided by alloying a eutectic copper-silver composition with up to 10 wt % nickel added. (Eutectic copper-silver is 72% silver and 28% copper by weight). The pre-form braze slug is assembled on a refractory metal surface pad 20 located on a ceramic substrate 10 as shown in FIG. 1A. A pressing weight 5 is then placed on top of pre-form braze slug 15, and force is applied in the direction of arrows "F," to hold the braze slug in place as shown in FIG. 1B. The assembly is then heated to perform a pre-bonding step in a reducing or neutral atmosphere to 800° C.–850° C. for 5 to 60 minutes and then cooled. During the pre-bonding step the pre-form braze slug 15 is partially fused to the refractory metal surface pad 20.

Figure 1C:
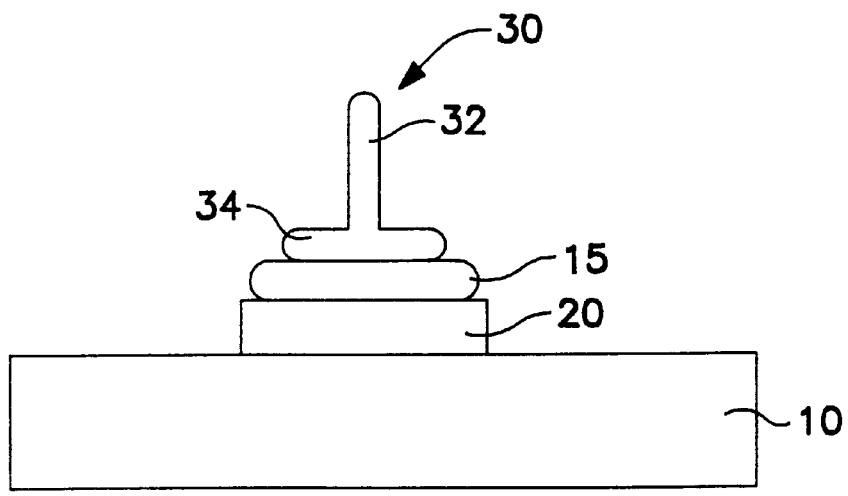
Figure 1D:
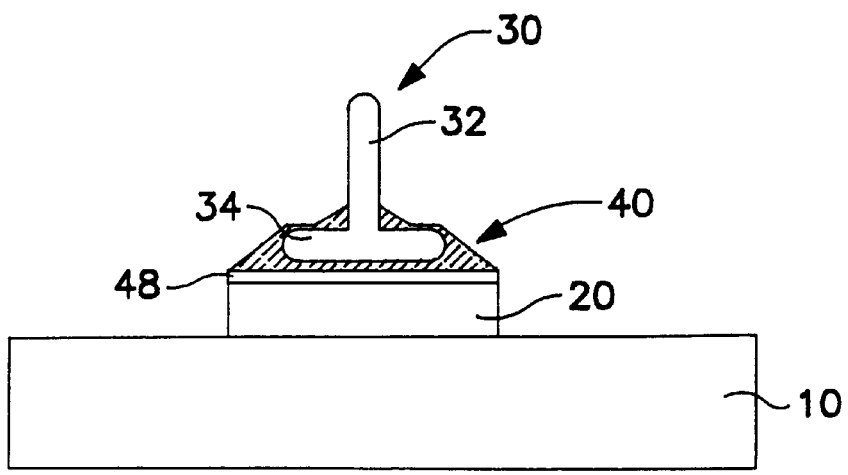
FIG. 1D is a partial cross-sectional view illustrating the braze joint which results upon using the direct brazing process according to the present invention to join a refractory metal surface pad located on a ceramic carrier to a metallic I/O pin.

After removing pressing weight 5, the pin head 34 of an I/O connection pin 30, to be brazed to the refractory metal surface pad 20, is set on the pre-form braze slug 15 as shown in FIG. 1C. The assembly is then heated to 840° C.–950° C. for 1 to 30 minutes to effect brazing such that the braze alloy flows to form braze joint 40 which has a nickel-rich interface 48 and securely fastens the pin head 34 of I/O connection pin 30 to the refractory metal surface pad 20 as shown in FIG. 1D. The brazed specimens were then subjected to the "Pin-Pull" test by placing the pin shank 32 of I/O connection pin 30 and ceramic substrate 10 into the grips of an INSTRON® Tensile Testing machine and applying an increasing load until failure.

Shown below in Table 1 are the specific materials combinations of the test assembly components used, heating steps and temperature profiles, and resultant data of the visual observation and pin-pull test performed on various specimens brazed using the two-step braze process:

TABLE 1

| Pre-Bond (Temp/ Time) | Braze Cycle (Temp/ Time) | Ni wt % in Cu—Ag Eutectic Braze | Refractory Metal Surface Pad Base Metal | Ceramic Substrate | I/O Connection Pin Type | Pre-Bond Adhesion | Braze Climb | Fillet Quality | Pin-Pull Test Shank-Fails/ Number of Specimens Tested |
|---|---|---|---|---|---|---|---|---|---|
| 700° C./30 min | 840° C./4 min | 7 | Moly* | $Al_2O_3$* | A* | poor | — | — | — |
| 750° C./30 min | 840° C./4 min | 7 | Moly | $Al_2O_3$ | A | poor | — | — | — |
| 780° C./30 min | 840° C./4 min | 7 | Moly | $Al_2O_3$ | A | med/poor | max | poor | N/A |
| 790° C./30 min | 840° C./4 min | 7 | Moly | $Al_2O_3$ | A | poor | max | poor | 6/9 = 66% |
| 800° C./30 min | 840° C./4 min | 7 | Moly | $Al_2O_3$ | A | med/poor | min | mod | 1/2 = 55% |
| 810° C./20 min | 840° C./4 min | 7 | Moly | $Al_2O_3$ | A | good | N/A | mod | 2/5 = 40% |
| 820° C./10 min | 840° C./4 min | 7 | Moly | $Al_2O_3$ | A | good | N/A | mod | 2/5 = 40% |
| 840° C./4 min | 840° C./4 min | 7 | Moly | $Al_2O_3$ | A | good | N/A | good | 4/4 = 100% |
| 860° C./10 min | 840° C./4 min | 7 | Moly | $Al_2O_3$ | A | good | N/A | Exc | 17/17 = 100% |

TABLE 1-continued

| Pre-Bond (Temp/Time) | Braze Cycle (Temp/Time) | Ni wt % in Cu—Ag Eutectic Braze | Refractory Metal Surface Pad Base Metal | Ceramic Substrate | I/O Connection Pin Type | Pre-Bond Adhesion | Braze Climb | Fillet Quality | Pin-Pull Test Shank-Fails/Number of Specimens Tested |
|---|---|---|---|---|---|---|---|---|---|
| 860° C./5 min | 850° C./4 min | 7 | Moly | Al$_2$O$_3$ | A | good | min | v. good | N/A |
| 860° C./7 min | 880° C./5 min | 7 | Moly | Al$_2$O$_3$ | A | good | N/A | good | 10/10 = 100% |
| 810° C./20 min | 900° C./5 min | 7 | Moly | Al$_2$O$_3$ | A | good | mod | good | 6/6 = 100% |
| 810° C./30 min | 900° C./5 min | 7 | Moly | Al$_2$O$_3$ | A | good | N/A | mod | N/A |
| 820° C./15 min | 900° C./5 min | 7 | Moly | Al$_2$O$_3$ | A | good | N/A | v. good | N/A |
| 820° C./30 min | 900° C./5 min | 7 | Moly | Al$_2$O$_3$ | A | good | min | good | 5/5 = 100% |
| 840° C./10 min | 840° C./5 min | 4 | Moly | Al$_2$O$_3$ | A | good | min | good | 4/4 = 100% |
| 860° C./15 min | 840° C./5 min | 7 | W* | AlN | A | good | N/A | v. good | N/A |
| 860° C./6 min | 880° C./5 min | 7 | W | AlN | A | good | N/A | good | N/A |
| 900° C./15 min | 840° C./30 min | 7 | W | AlN | A | good | N/A | good | N/A |
| 900° C./5 min | 950° C./5 min | 7 | W | AlN | A | good | N/A | good | N/A |
| 950° C./5 min | 950° C./5 min | 7 | W | AlN | A | good | mod | good | N/A |
| 860° C./10 min | 840° C./4 min | 7 | W | AlN | B* | good | N/A | mod | 18/30 = 60% |
| 860° C./10 min | 900° C./5 min | 7 | W | AlN | B | good | N/A | good | N/A |

*these examples were not under load during braze.

Continuous Braze Process

Figure 2:
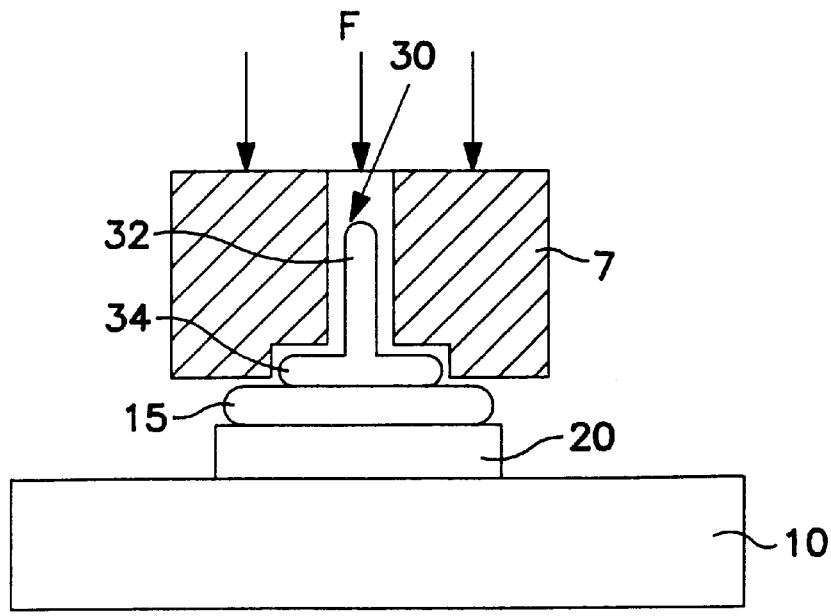
FIG. 2 is a partial cross-sectional view illustrating a continuous process of direct brazing a refractory metal surface pad located on a ceramic carrier to a metallic I/O pin using a pre-form brazing slug according to the present invention.

Shown in FIG. 2 is a continuous brazing process which comprises heating the assembled test structure through the two temperature profiles used in the two-step brazing process but in a single continuous heating cycle without cooling between the two hold temperatures. This continuous brazing process uses a braze fixture 7 which both simultaneously positions and applies weight to the assembled pin structure to be bonded. The assembled pin structure is shown in FIG. 2 and includes a pre-form braze slug 15 placed on a refractory metal surface pad 20 which is disposed on a ceramic substrate 10. The pin head 34 of an I/O connection pin 30 is placed on pre-form braze slug 15. Braze fixture 7 which is configured to mate with I/O connection pin 30 is placed over the pin shank 32 and pin head 34 as shown.

The assembly is heated to 800° C.–850° C. for 5 to 60 minutes and then, without cooling, the temperature is raised to the brazing temperature of 840° C.–1000° C. for 1 to 30 minutes. The assembly is then cooled to form braze joint 40 having a nickel-rich interface 48 shown in FIG. 1D. Like the two-step cycle described above, the first part of the heating cycle is for pre-bonding and the second part is for brazing the component parts together. Unlike the two-step cycle, however, the heating steps are performed as one continuous cycle. In this manner the continuous braze process eliminates the need for stopping the braze operation after the pre-bond step in order to position I/O connection pin 30 on the refractory metal surface pad 20 prior to performing the second heating cycle during which brazing takes place.

Although the continuous braze process is described above as having two distinct holding temperatures, a first low temperature hold for pre-bonding and a second higher temperature hold for brazing, these heating steps may also be performed by controlling the heating rate to provide a temperature profile which gradually passes through the temperature ranges required without stopping at any particular temperature.

The brazed specimens were then subjected to the "Pin-Pull" test by placing the pin shank 32 of I/O connection pin 30 and ceramic substrate 10 into the grips of an INSTRON® Tensile Testing machine and applying an increasing load until failure. Shown below in Table 2 are the specific materials combinations of the test assembly components used, heating steps and temperature profiles, and resultant data of the visual observation and pin-pull test performed on various specimens brazed using the continuous braze process. With respect to the specimens having a heating profile with only a high temperature hold specified, the low temperature pre-bond step was performed during heating up to the high temperature braze step by controlling the heating rate to approximately 40–50° C./min.

TABLE 2

| Profile | | Ni % in Cu—Ag Eutectic Braze | Refractory Metal Surface Pad Base Metal | Ceramic Substrate Material | I/O Connection Pin Type | Braze Climb | Fillet Quality | Pin Pull Test Shank-Fails/Number of Specimens Tested |
|---|---|---|---|---|---|---|---|---|
| Low Temp (Time/Temp) | High Temp (Time/Temp) | | | | | | | |
| 810° C./30 min* | 860° C./5 min | 7 | Moly | Al$_2$O$_3$ | A | mod | Mod | 1/2 = 50% |
| — | 840° C./6 min | 7 | Moly | Al$_2$O$_3$ | A | min | N/A | 1/4 = 25% |
| 840° C./6 min | 960° C./2 min | 7 | Moly | Al$_2$O$_3$ | A | mod | N/A | 4/4 = 100% |
| —* | 860° C./10 min | 7 | W | AlN | B | mod | N/A | N/A |
| —* | 840° C./10 min | 4 | Moly | Al$_2$O$_3$ | A | max | Poor | 0/4 = 0% |
| 830° C./12 min | 920° C./2 min | 4 | Moly | Al$_2$O$_3$ | A | mod | good | 4/4 = 100% |
| 840° C./6 min | 960° C./2 min | 4 | Moly | Al$_2$O$_3$ | A | mod | mod | 2/2 = 100% |

TABLE 2-continued

| Profile | | Ni % in Cu—Ag Eutectic Braze | Refractory Metal Surface Pad Base Metal | Ceramic Substrate Material | I/O Connection Pin Type | Braze Climb | Fillet Quality | Pin Pull Test Shank-Fails/ Number of Specimens Tested |
|---|---|---|---|---|---|---|---|---|
| Low Temp (Time/Temp) | High Temp (Time/Temp) | | | | | | | |
| 830° C./6 min | 900° C./2 min | 4 | Moly | $Al_2O_3$ | A | min | good | 7/8 = 88% |
| 830° C./4 min | 910° C./2 min | 4 | Moly | $Al_2O_3$ | A | min | good | 8/8 = 100% |
| — | 910° C./2 min | 4 | Moly | $Al_2O_3$ | A | min | N/A | 4/4 = 100% |
| 825° C./20 min | 865° C./2 min | 2 | Moly | $Al_2O_3$ | A | mod | N/A | 1/3 = 33% |
| 795° C./30 min | 840° C./2 min | 2 | Moly | $Al_2O_3$ | A | mod | N/A | 2/4 = 50% |
| — | 840° C./10 min | 2 | Moly | $Al_2O_3$ | A | min | N/A | 4/4 = 100% |

*these examples were not under load during braze.

Braze Paste Process

Figure 3:
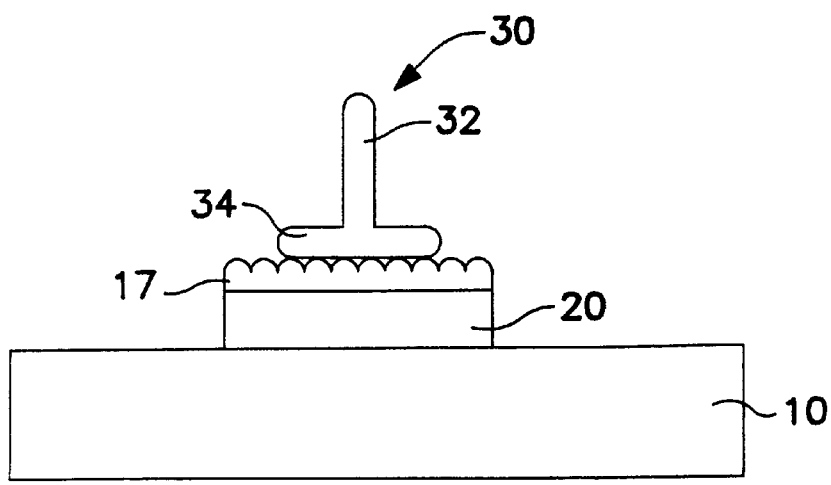
FIG. 3 is a partial cross-sectional view illustrating the process of direct brazing a refractory metal surface pad located on a ceramic carrier to a metallic I/O pin using a brazing paste according to the present invention.

Shown in FIG. 3 is a two-step direct brazing process according to the present invention which uses a braze paste and includes a pre-bond heating step to partially bond the braze to a refractory metal surface pad prior to brazing. The braze paste process is performed by screening a braze paste 17 onto a refractory metal surface pad 20 through a mask or by any other patterning method as is known in the art. The braze paste contains an organic binder and a solid content comprising from 2–7 wt % Ni based on the total solid content with the remaining solids comprising a eutectic copper-silver alloy. Ceramic substrate 10 having disposed on it refractory metal surface pad 20, which is coated with braze paste 17, is then heated to 850–1000° C. for 10 to 120 minutes to facilitate some sintering and bonding of the solids content of braze paste 17 to refractory metal surface pad 20. An I/O connection pin 30 is then placed on braze paste 17 on the refractory metal surface pad 20, as shown in FIG. 3, and the assembly is then heated to 840° C.–950° C. for 1 to 30 minutes to effect brazing. Upon brazing, the braze alloy flows to form braze joint 40 shown in FIG. 1D which has a nickel-rich interface 48 and securely fastens the pin head 34 of I/O connection pin 30 to the refractory metal surface pad 20.

The brazed specimens were then subjected to the "Pin-Pull" test by placing the pin shank 32 of I/O connection pin 30 and ceramic substrate 10 into the grips of an INSTRON® Tensile Testing machine and applying an increasing load until failure. Shown below in Table 3 are the specific materials combinations of the test assembly components used, heating steps and temperature profiles, and resultant data of the visual observation and pin-pull test performed on various specimens brazed using the braze paste process. With respect to the specimen only having a braze temperature of 980° C. specified for 0 minutes, both of the pre-bond and braze steps were performed during heating up to 980° C. by varying the heating rate from initially approximately 50° C./min to approximately 10° C.–15° C./min at above 900° C. Once 980° C. was achieved the specimen was immediately cooled.

TABLE 3

| Pre-Bond (Temp/Time) | Braze (Temp/Time) | Ni % in Cu—Ag Eutectic Braze Paste | Refractory Metal Surface Pad Base Metal | Ceramic Substrate Material | Pin Type | Pre-Tin Quality | Braze Climb | Fillet Quality | Pin-Pull Test Shank-Fails/ Number of Specimens Tested |
|---|---|---|---|---|---|---|---|---|---|
| 980° C./10 min | 900° C./3 min | 2 | Moly | $Al_2O_3$ | A | need more braze | mod | mod | 20/20 = 100% |
| 980° C./7 min | 860° C./2 min | 2 | Moly | $Al_2O_3$ | A | need more braze | min | mod | 20/20 = 100% |
| — | 980° C./0 min | 2 | Moly | $Al_2O_3$ | A | — | N/A | N/A | N/A |
| 980° C./7 min | 880° C./2 min | 2 | Moly | $Al_2O_3$ | A | good | min | good | N/A |
| 980° C./7 min | 850° C./2 min | 2 | Moly | $Al_2O_3$ | A | good | min | good | N/A |

Evaluation of Specimens

From the data in Tables 1–3, it can be seen that a ternary copper-silver-nickel braze material made, according to the present invention, by alloying a eutectic copper-silver composition (i.e., 72% silver and 28% copper by weight) with up to about 7 wt % nickel may be used in various braze forms under various brazing conditions to join refractory metals directly to other metallic objects without the need for an adhesion layer. Based upon the liquidus temperature of the Ag—Cu—Ni ternary phase diagram, it is expected that a braze material of a eutectic copper-silver composition alloyed with up to about 10 wt % nickel may also be used. Preferably, the direct brazing method is performed using a pre-form braze slug or a braze paste having a eutectic silver-copper alloy composition to which 4 wt % nickel is added. On pull testing the pins brazed with the preferred composition having 4 wt % nickel using the preferred braze cycles discussed below, only pin shank failures were observed at a tensile force of −21 lbs. without any braze/refractory metal surface pad separation.

From the data in Table 1, it can be seen that the preferred brazing conditions when using a two-step braze process with a braze having the preferred 4 wt % nickel concentration is a first pre-bond cycle at about 840° C. for about 5–10 minutes with a second braze cycle at greater than about 840° C. for about 5–10 minutes. When using a braze having a higher concentration of 7 wt % nickel, higher temperatures are preferred for the two-step cycle with the first pre-bond cycle at about 860° C. for about 5–10 minutes with the second braze cycle at about 900° C. for about 5 minutes.

From the data in Table 2, it can be seen that the preferred brazing conditions when using a continuous braze process having a single continuous heating cycle with two hold temperatures without cooling between the hold temperatures and a braze having the preferred 4 wt % nickel concentration is a first low-temperature cycle at about 830° C.–840° C. for about 4–6 minutes with a second high-temperature cycle at about 910° C. for about 2 minutes. When using a braze having a higher concentration of 7 wt % nickel, higher temperatures are preferred for the low and high temperature cycles with the first low-temperature cycle at about 840° C. for about 6 minutes with the second high-temperature cycle at about 960° C. for about 2 minutes.

Although only a paste braze having 2 wt % nickel was tested, the data in Table 3 show that, when using a two-step braze process, the preferred braze profile is a first pre-bond cycle at about 980° C. for about 7 minutes with a second braze cycle at about 860° C.–870° C. for about 2 minutes. When using a paste braze having the higher preferred nickel concentration of 4 wt % nickel, it is expected that a slightly longer pre-bond cycle (i.e., a pre-bond cycle at about 980° C. for about 10 minutes) would be preferred.

Advantages of the Pinning Process of the Present Invention

Figure 4:
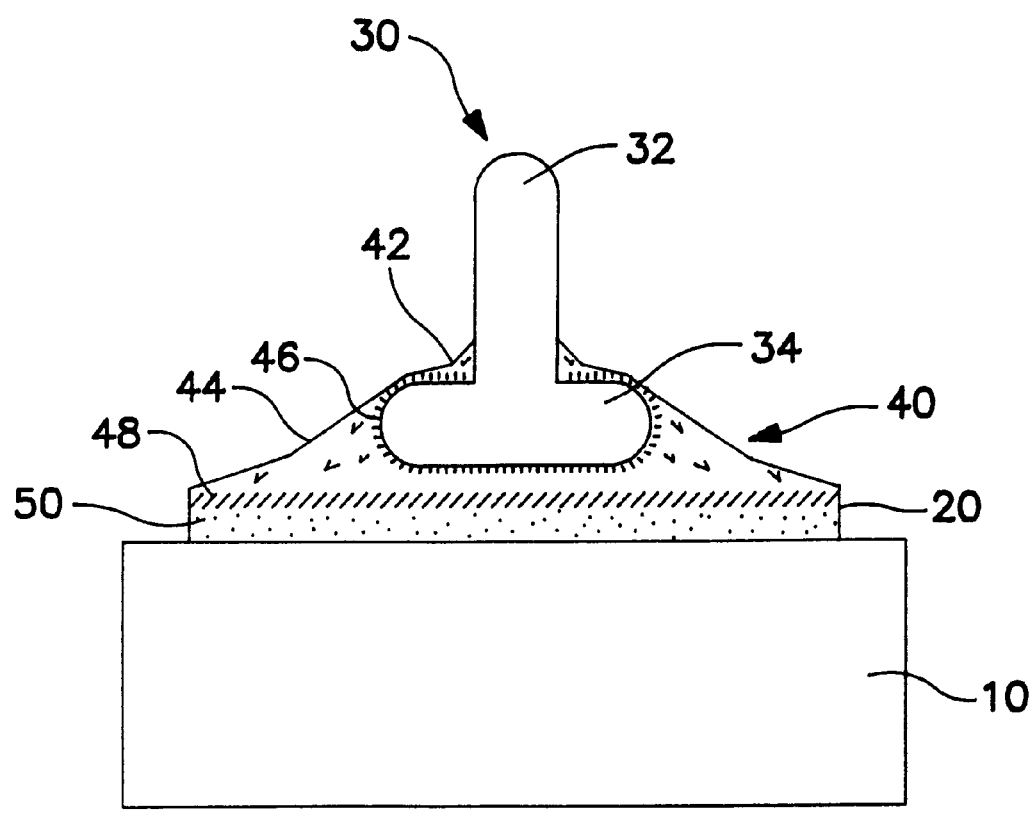
FIG. 4 is a partial cross-sectional schematic illustrating the braze microstructure which typically results upon using the direct brazing process according to the present invention to join a refractory metal surface pad located on a ceramic carrier to a metallic I/O pin.

In addition to providing a lower cost method for brazing refractory metals which eliminates the need for disposing an adhesion promoting layer of nickel on the refractory metal prior to brazing, the process of the present invention also provides a brazed joint having improved mechanical properties as a result of the microstructure which occurs upon brazing. Shown in FIG. 4 is a schematic of the microstructure observed for specimens brazed using the ternary copper-silver-nickel braze material made by alloying a eutectic copper-silver composition (i.e., 72% silver and 28% copper by weight) with up to 10 wt % nickel according to the present invention. As can be seen in the schematic, upon joining I/O connection pin 30 to refractory metal surface pad 20, the braze alloy flows to form braze joint 40 having a pin fillet 42 and a pad fillet 44 which securely fasten the pin head 34 of I/O connection pin 30 to the refractory metal surface pad 20. The braze may "climb" part-way up pin shank 32 of I/O connection pin 30.

Upon using the ternary braze alloy to braze the refractory metal surface pads according to the present invention, it is observed that the nickel in the braze alloy is drawn toward and reacts with the surface of the refractory metal to form a thin nickel-rich interface layer 48 which is believed to be a nickel-refractory metal intermetallic compound. Nickel-rich interface layer 48 is a thin nickel-containing layer which is thinner than that which results from conventional brazing processes which require a much thicker nickel layer as an adhesion layer for the braze. This thinner nickel-containing layer which forms during brazing helps to reduce the stresses generated during brazing caused by the different thermal coefficients of expansion of the various material layers of the brazed joint. Thus, as a result of using the Cu—Ag—Ni ternary braze alloy according to the brazing process of the present invention, a brazed joint between a refractory metal and a metallic item is provided having a substantially reduced layer of nickel in the as-brazed joint which improves the mechanical properties of the joint.

If a nickel-plated KOVAR® alloy I/O connection pin 30 is used to enhance the wetting of the braze, the nickel from the outer plating layer also diffuses into braze joint 40 to form a nickel-rich region 46 which surrounds pin head 34 but does not affect the mechanical properties of the joint. This nickel-rich region is not present if a KOVAR® alloy pin without nickel plating is used.

Shown in refractory metal surface pad 20 are non-metallic additives 50 which are typically alumina and glass particles incorporated into and dispersed throughout the refractory metal surface pads. These particles are provided in minor amounts to facilitate adhesion of the refractory metal to the ceramic substrate 10 during manufacture of the substrate. Because non-metallic additives 50 do not affect the adhesion between the refractory metal surface pads and the metallic I/O pin to be brazed, the exact composition and the relative amounts are not critical to the brazing process of the present invention. As will be readily recognized by those having ordinary skill in the art, other non-metallic additives may be incorporated in place of or in addition to those provided and in amounts sufficient to promote bonding of the refractory metal surface pads to the ceramic substrate.

Variations of the Present Invention

Although the brazing process according to the present invention is illustrated above with respect to joining a refractory metal surface pad to an I/O connection pin, it is understood that any type of refractory metal component may be brazed to other metallic objects using the ternary Cu—Ag—Ni braze alloy described above. Such components may include, but are not limited to, other components used with electronic packaging such as heat slugs, field caps, seal-bands, and lead frames.

Other various modifications may also be made as will be readily recognized by those having ordinary skill in the art. For instance, such modifications may include pre-attaching the pre-form braze slug or braze paste material to the item to be brazed (e.g., the pin head) prior to placing the item onto the surface to which it is to be brazed. Other modifications can include applying an additional load to pressing weight 5 and braze fixture 7 as shown by the force designated as "F" in FIGS. 1B and 2, respectively, in order to further improve the resultant braze joint.

Although illustrated and described with reference to certain specific embodiments, the present invention is nevertheless not intended to be limited to the details shown. Rather, various modification may be made in the details within the scope and range of equivalents of the claims and without departing from the spirit of the invention.

What is claimed:

1. A process for brazing a refractory metal article to a metal object comprising the steps of providing a metal article, comprising at least one refractory metal, and a metal object;

disposing a braze alloy comprising a copper-silver-nickel alloy between said metal article and said metal object;

heating said metal article, said metal object, and said braze allow in a first pre-bond heating cycle; and heating said metal article, said metal object, and said braze alloy in a second braze heating cycle to a temperature for a time sufficient to braze said metal article to said metal object, wherein the nickel component of said braze alloy is drawn to and reacts with said refractory metal to form a nickel-rich interface layer, and wherein said braze alloy is a copper/silver eutectic composition alloy with about 4 weight percent nickel and said first pre-bond heating cycle is performed at about 840° C. for about 5 to about 10 minutes and said second braze heating cycle is performed at greater than about 840° C. for about 5 to about 10 minutes.

2. A process for brazing a refractory metal article to a metal object comprising the steps of:
providing a metal article, comprising at least one refractory metal, and a metal object;
disposing a braze alloy comprising a copper-silver-nickel alloy between said metal article and said metal object;
heating said metal article, said metal object, and said braze allow in a first pre-bond heating cycle; and
heating said metal article, said metal object, and said braze alloy in a second braze heating cycle to a temperature for a time sufficient to braze said metal article to said metal object, wherein the nickel component of said braze alloy is drawn to and reacts with said refractory metal to form a nickel-rich interface layer, and wherein said braze alloy is a copper/silver eutectic composition alloy with about 7 weight percent nickel and said first pre-bond heating cycle is performed at about 860° C. for about 5 to about 10 minutes and said second braze heating cycle is performed at greater than about 900° C. for about 5 minutes.

3. A process for brazing a refractory metal article to a metal object comprising the steps of
providing a metal article, comprising at least one refractory metal, and a metal object;
disposing a braze alloy comprising a copper-silver-nickel alloy between said metal article and said metal object;
heating said metal article, said metal object, and said braze allow in a first pre-bond heating cycle; and
heating said metal article, said metal object, and said braze alloy in a second braze heating cycle to a temperature for a time sufficient to braze said metal article to said metal object, wherein the nickel component of said braze alloy is drawn to and reacts with said refractory metal to form a nickel-rich interface layer, and wherein said braze alloy is a copper/silver eutectic composition alloy with about 4 weight percent nickel and said first pre-bond holding temperature is at about 830 to about 840° C. for about 4–6 minutes and said second brazing holding temperature is at about 910° C. for about 2 minutes.

4. A process for brazing a refractory metal article to a metal object comprising the steps of:
providing a metal article, comprising at least one refractory metal, and a metal object;
disposing a braze alloy comprising a copper-silver-nickel alloy between said metal article and said metal object;
heating said metal article, said metal object, and said braze allow in a first pre-bond heating cycle; and
heating said metal article, said metal object, and said braze alloy in a second braze heating cycle to a temperature for a time sufficient to braze said metal article to said metal object, wherein the nickel component of said braze alloy is drawn to and reacts with said refractory metal to form a nickel-rich interface layer, and wherein said braze alloy is a copper/silver eutectic composition alloy with about 7 weight percent nickel and said first pre-bond holding temperature is at about 840° C. for about 6 minutes and said second braze holding temperature is at about 960° C. for about 2 minutes.

5. The process of claim 1 wherein said at least one refractory metal is selected from the group consisting of molybdenum, tungsten, and alloys thereof.

6. The process of claim 1 wherein said metal article is an input/output surface pad and said at least one refractory metal is selected from the group consisting of molybdenum, tungsten, and alloys thereof, and
said metal object is an input/output connection pin of a material selected from the group consisting of an iron-nickel-cobalt alloy and a nickel-plated iron-nickel-cobalt alloy.

7. A process for brazing a refractory metal article to a metal object comprising the steps of:
providing a metal article, comprising at least one refractory metal, and a metal object;
disposing between said metal article and said metal object a braze paste comprising a copper-silver eutectic alloy and nickel;
heating said metal article, said metal object, and said braze paste in a first pre-bond heating cycle; and
heating said metal article, said metal object, and said braze paste in a second braze heating cycle to a temperature for a time sufficient to braze said metal article to said metal object, wherein the nickel component of said braze alloy is drawn to and reacts with said refractory metal to form a nickel-rich interface layer, and wherein said braze alloy is a copper/silver eutectic composition alloy with about 2 weight percent nickel and said first pre-bond heating cycle is performed at about 980° C. for about 10 minutes and said second braze heating cycle is performed at greater than about 860° C. for about 2 minutes.

8. The process of claim 7 wherein said braze paste comprises a copper/silver eutectic alloy composition mixed with from 1–10 weight percent nickel.

9. The process of claim 8 wherein said nickel in said braze paste is in an amount of about 2 weight percent.

10. The process of claim 7 wherein said at least one refractory metal is selected from the group consisting of molybdenum, tungsten, and alloys thereof.

11. The process of claim 7 wherein said metal article is an input/output surface pad and said at least one refractory metal is selected from the group consisting of molybdenum, tungsten, and alloys thereof, and
said metal object is an input/output connection pin of a material selected from the group consisting of an iron-nickel-cobalt alloy and a nickel-plated iron-nickel-cobalt alloy.

* * * * *